(12) United States Patent
Prunean

(10) Patent No.: US 8,976,844 B2
(45) Date of Patent: Mar. 10, 2015

(54) RECEIVER FOR DETECTION AND TIME RECOVERY OF NON-COHERENT SIGNALS AND METHODS OF OPERATING SAME

(75) Inventor: Cornel Prunean, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 447 days.

(21) Appl. No.: 13/372,879

(22) Filed: Feb. 14, 2012

(65) Prior Publication Data

US 2013/0208767 A1 Aug. 15, 2013

(51) Int. Cl.
*H04B 1/709* (2011.01)

(52) U.S. Cl.
USPC ........................................... 375/150

(58) Field of Classification Search
CPC ............ G01S 19/00; H04B 1/00; H04B 1/69; H04B 1/709; H04B 15/00; H04K 1/00; H04L 27/00; H04L 27/30
USPC ........ 342/357.2; 370/320, 342; 375/150, 260, 375/316, 343; 701/2
See application file for complete search history.

(56) References Cited

U.S. PATENT DOCUMENTS

| | | | |
|---|---|---|---|
| 5,687,190 A * | 11/1997 | Tsao | 375/142 |
| 6,121,926 A * | 9/2000 | Belcher et al. | 342/450 |
| 6,163,567 A * | 12/2000 | Hatch | 375/149 |
| 6,437,734 B1 | 8/2002 | McBurney et al. | |
| 6,674,401 B2 | 1/2004 | McBurney et al. | |
| 7,619,559 B2 | 11/2009 | DiEsposti | |
| 2005/0080561 A1 | 4/2005 | Abraham et al. | |
| 2007/0160117 A1 | 7/2007 | Nitta et al. | |
| 2007/0183486 A1 | 8/2007 | Cheng et al. | |
| 2009/0028223 A1 | 1/2009 | Chen | |
| 2009/0054075 A1 * | 2/2009 | Boejer et al. | 455/456.1 |
| 2009/0225816 A1 * | 9/2009 | Cheng et al. | 375/150 |
| 2011/0194571 A1 * | 8/2011 | Ozluturk et al. | 370/479 |
| 2012/0051402 A1 * | 3/2012 | Cheng et al. | 375/148 |
| 2013/0129026 A1 * | 5/2013 | Petersen | 375/371 |

FOREIGN PATENT DOCUMENTS

AU 2011265571 A1 2/2012
KR 20110060734 A 6/2011

OTHER PUBLICATIONS

Combined Search and Examination Report for Application No. GB1302588.7; Aug. 14, 2013; 7 pages.

* cited by examiner

*Primary Examiner* — Sam K Ahn
*Assistant Examiner* — Shawkat M Ali
(74) *Attorney, Agent, or Firm* — Armstrong Teasdale LLP

(57) ABSTRACT

A method for processing a signal having a plurality of codes. The method includes receiving the signal at a receiver and removing a carrier signal from the signal. The method further includes isolating a data stream from the carrier signal and determining timing of the plurality of codes. The plurality of codes is filtered to separate from the plurality of codes in the data stream a particular code for each plurality of codes that correlates to the received signal.

10 Claims, 6 Drawing Sheets

RECEIVER FOR DETECTION AND TIME RECOVERY OF NON-COHERENT SIGNALS AND METHODS OF OPERATING SAME

BACKGROUND

The present disclosure relates to methods and systems for global positioning, and more specifically, to methods and systems for acquiring global positioning system signals from satellites to determine a location of a user receiver.

The Global Positioning System (GPS), a world-wide radio navigation system, provides an ability to obtain real time location and position information for mobile platforms and/or individuals. GPS includes a constellation of satellites, known as space vehicles, ground or base stations, and user receivers.

Using the locations of satellites as reference points, the position of the user receiver may be calculated accurately to within meters and sometimes even within centimeters. Each of the satellites, the ground stations, and the user receiver has preprogrammed timed signals that initiate at precise times. In order to lock on to the signals broadcasted by the satellites, the ground station and user receiver slew their respective internal generated signals relative to time as predicted by their respective internal clocks. When the signals are locked, each user receiver may calculate ranging measurements to each satellite called pseudo ranges, by determining the delays in the signal transmissions from the satellites. The pseudo range measurements include the actual ranges to satellites, in addition to an error associated with the receiver clock time offset relative to GPS time, plus other smaller errors. The ground stations included in the GPS provide ranging measurements that are used to generate predictions for the satellites, clocks, and orbits.

Signal acquisition is an important phase associated with the GPS receiver. Known GPS navigation systems are synchronized when an exact copy of the space vehicle's specific pseudo-random noise code of the received signal is available to demodulate data properly, a process characterized as coherent. However, if the received GPS signal is distorted or corrupted by factors such as, for example, noise, interfering signals and/or jamming, the signal is non-coherent. GPS receivers are needed that enable non-coherent detection and time recovery for distorted signals.

BRIEF SUMMARY

In one aspect, a method for processing a signal having a plurality of codes is provided. The method includes receiving the signal at a receiver and removing a carrier signal from the signal. The method further includes isolating a data stream from the carrier signal and determining timing of the plurality of codes. The plurality of codes is filtered to separate from the plurality of codes in the data stream a particular code for each plurality of codes that correlates to the received signal.

In another aspect, a receiver for processing a non-coherent signal having a plurality of codes is provided. The receiver includes an antenna configured to receive the non-coherent signal. A demodulator is coupled to the antenna for use in removing a carrier signal from the non-coherent signal. The receiver includes a processor coupled to the demodulator for use in isolating a data stream from the carrier signal and for determining a timing of the plurality of codes. A timed match window filter is coupled to the processor for use in selecting from the plurality of codes a particular code for each plurality of codes that correlates to the received non-coherent signal.

In a further aspect, a method for processing a non-coherent signal having a plurality of codes is provided. The method includes receiving the non-coherent signal at a receiver and removing a carrier signal from the non-coherent signal by generating a synchronizing timing signal based on a numerical analysis of the second difference of the non-coherent signal. The method further includes isolating a data stream from the carrier signal and determining the timing of the plurality of codes by determining zero crossings which correspond to a symbol state change of the non-coherent signal. The plurality of codes is filtered to separate from the plurality of codes in the data stream a particular code for each plurality of codes that correlates to the received non-coherent signal.

Although specific features of various embodiments may be shown in some drawings and not in others, this is for convenience only. Any feature of any drawing may be referenced and/or claimed in combination with any feature of any other drawing.

DETAILED DESCRIPTION

The embodiments described herein relate to space vehicle signal acquisition. More specifically, the embodiments described herein facilitate signal acquisition for rapid, reliable and robust acquisition of the signals, including non-coherent signals. Moreover, the embodiments enable signals to be acquired in challenged environments associated with signal power attenuation or interference, e.g. in-doors, under foliage, and/or under jamming conditions. Furthermore, the embodiments described herein facilitate non-coherent signal detection and time recovery for factory testing of the space vehicle GPS signal quality such as, but not limited to correlation loss, code power ratios, crosstalk, signal coherence and delays. Further, the embodiments facilitate partial correlation of the received signal, such as when only part of the signal is received and a receiver does not have sufficient information for a decision in selecting the proper space vehicle pseudo-random noise code. Moreover, the embodiments facilitate extracting GPS codes for the received signal when a replica of the codes is not available. In addition, the embodiments facilitate developing, and testing the ability to develop and test new pseudo random noise codes.

Figure 1:
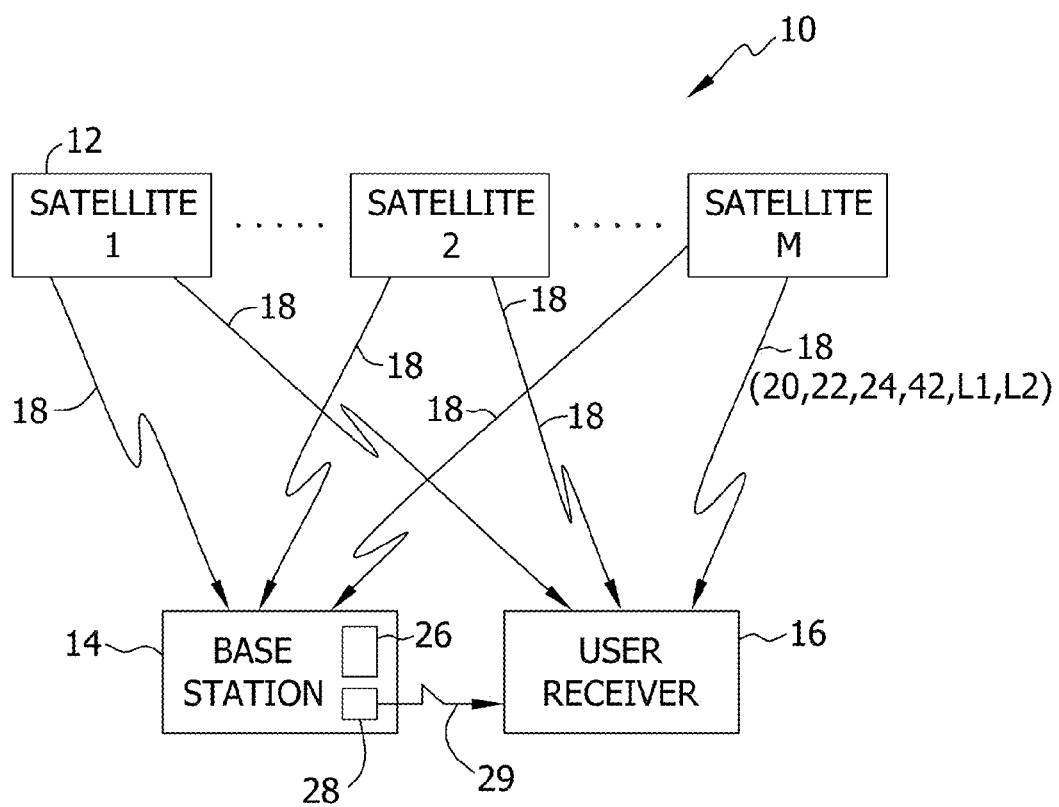
FIG. 1 illustrates an exemplary global positioning system (GPS).

FIG. 1 illustrates an exemplary global positioning system (GPS) 10. In the exemplary embodiment, GPS 10 includes a plurality of GPS satellites 12, a base station 14, and a user receiver 16. Satellites 12 are coupled in wireless communication to base station 14 and to user receiver 16. Additionally, base station 14 is coupled in wireless communication to user receiver 16. The locations of satellites 12 are used as reference points to assist signal processing and to enable the location of user receiver 16 to be accurately determined. In the exemplary embodiment, satellites 12 include a constellation of "M" number of satellites in the Earth's orbit that are in view of user receiver 16.

Each satellite 12 transmits GPS satellite signals 18, including a unique Pseudo-Random Noise (PRN) Code 20 and a Navigation (Nav) message 22, via a carrier signal 24 such as, for example, two carrier signals, L1 and L2. More particularly, for PRN code 20 and Nav message 22 to travel with carrier signal 24, PRN code 20 and Nav message 22 are modulated onto carrier signal 24. In the exemplary embodiment, the L1 carrier signal is 1575.42 MHz and carries both PRN code 20 and Nav message 22 for timing and the L2 carrier is 1227.60 MHz. The L2 signal is normally used for military purposes. Two types of PRN codes 20, called Coarse Acquisition (C/A) code and Precise (P) code exist. The C/A code, intended for civilian use, modulates the L1 carrier signal at a rate of 1.023 MHz and repeats every 1023 bits. Thus, the length of the C/A code is one millisecond (1023 bits/1.023 MHz). The P code, intended for military use, repeats on a seven-day cycle and modulates both the L1 and L2 carrier signals at a 10.23 MHz rate. When the P code is encrypted, it is called the "Y" code. The (C/A) code and (P) code are coupled in-phase, quadrature of the L1 and L2 carriers arranged orthogonally, and are known as In-phase (I) code and Quadrature phase (Q) code. Satellites 12 also transmit signals 18 on other carrier frequencies such as L3, L4, and L5 carrier frequencies. The L3 carrier frequency is used for monitoring nuclear detonations. The L4 carrier frequency is being studied for additional ionospheric correction, and the L5 carrier frequency is 1176.45 MHz and is used for Safety-Of-Life Pilot signals. The phase for L5 carrier includes In-phase (I) code and Quadrature phase (Q) code.

The Nav message 22 includes a low frequency, modulo-two signal coupled to the PRN codes 20 on L1 and L2 carrier signals which carries information about satellites' positions, orbits, clocks corrections and other system status. When GPS satellite ranging signals 18 are broadcast to Earth, signals 18 directly reach the user receiver 16 with a propagation delay that is proportional to the distance between satellite 12 and user receiver 16. As such, the satellite-user distance can be calculated by multiplying the propagation delay with the speed of light in vacuum. However, along the route to user receiver 16, GPS satellite signals 18 may encounter additional delay uncertainties, caused by parameters such as, but not limited to, satellite ephemeris errors, clock errors, ionospheric and atmospheric effects, multi-path propagation and/or receiver clock error.

At ground level, base station 14 includes a stationary receiver 26 located at an accurately surveyed point. Base station 14 is configured to receive GPS satellite ranging signals 18 from each of satellites 12. To facilitate reducing or eliminating the delays and errors in GPS satellite ranging signals 18, other stationary ground stations 28, called differential GPS ground stations, may be used. Ground stations 28 have known locations from accurate surveyed data and independently calculate their locations from GPS satellites 12, wherein the error differential is broadcasted to nearby GPS receivers 16 so that receivers 16 may correct their positions by the same differential. The broadcasting of the differential error is performed over a radio frequency (RF) wireless communications link. User receiver 16 may be stationary for the time being, or may be roaming, wherein user receiver 16 applies these corrections to its ranging measurements to reduce position calculation errors. Differential ground station 28 knows its fixed position and calculates an expected propagation delay for each GPS satellite signal 18, such that the delay calculation is based on a broadcast ephemeris of where each satellite 12 should be positioned in space. Differential ground station 28 compares a calculated propagation delay for satellite ranging signals 18 to an actual propagation delay measured for signals 18, for all satellites 12 to determine a position error correction information 29 related to the signals 18 for each satellite 12. Differential ground station 28 then transmits the position error correction information for each satellite 18 to user receiver 16.

Alternately, any user receiver 16 within a connected network of user receivers 16 (not shown) may substitute for base station 14, performing the same functions as base station 14, and provide the same type of initialization information to aid operation of a second user receiver 16. The transmission medium connecting the two user receivers can be either radio frequency (RF) wireless or a direct line cable connection. Thus, it will be understood that while certain embodiments may be described with reference to base station 14 (and information supplied from base station 14) that the use of base station 14 is not necessary in implementing all of the embodiments and methods described herein.

Figure 2:
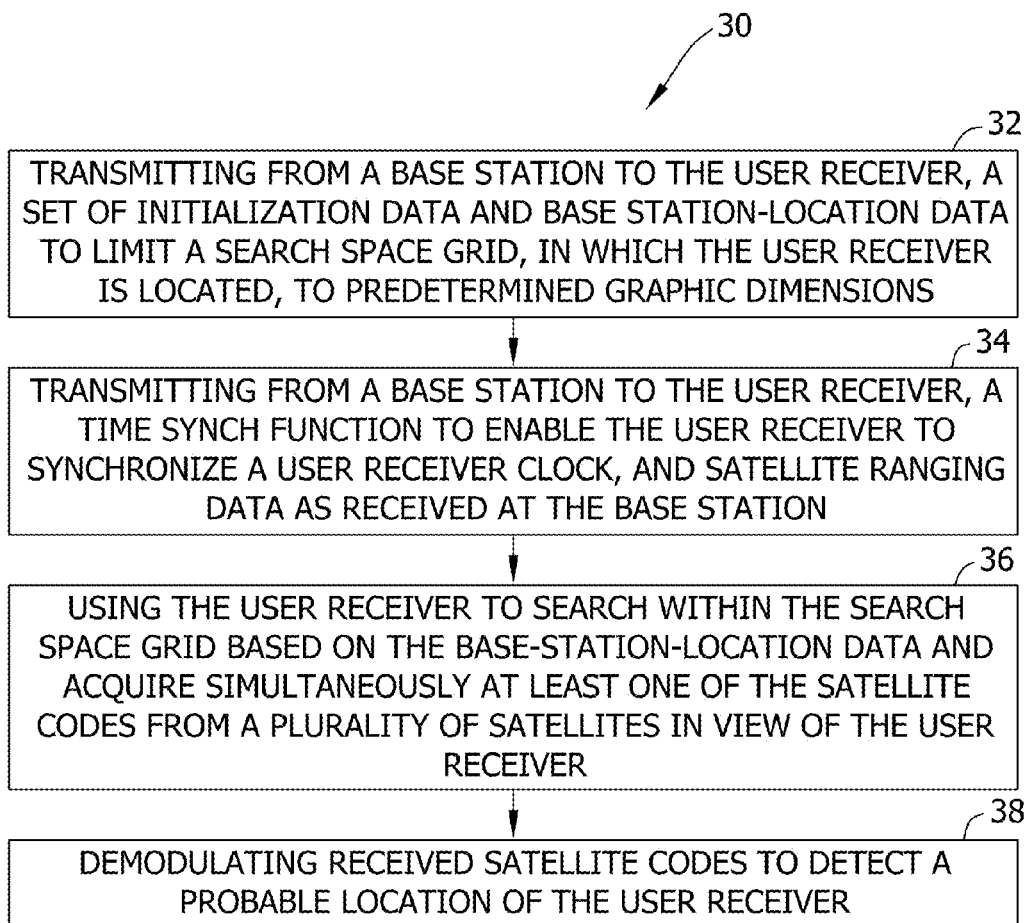
FIG. 2 is a flowchart illustrating an exemplary method of acquiring a signal.

FIG. 2 is a flow chart illustrating an exemplary method 30 of acquiring satellite signal 18. For signal processing, when user receiver 16 is first turned ON or activated to begin processing GPS signals 18, receiver 16 searches for, acquires and locks on to GPS satellite ranging signals 18 from multiple satellites 12 in view. User receiver 16 also make distance measurements (called pseudo ranges) for each satellite PRN code 20 in view of user receiver 16, demodulates the Nav message 22 superimposed on the PRN code 20, applies any error corrections sent to it from base station 14, if operating in the differential GPS mode, and uses this information to solve for user receiver's position and user receiver clock offset relative to GPS time. Additionally, in order to determine the distance between any satellite 12 in view and user receiver 16, user receiver 16 determines the actual propagation delay for signal 18 and applies the error correction information received from base station 14 to calculate corrected propagation delay. The corrected propagation delay is then multiplied by the speed of light to determine the distance to signal sending satellite 12. After acquiring GPS satellite ranging signals 18 of at least four satellites 12, user receiver 16 solves for its position and time error relative to GPS time.

As each GPS satellite signal 18 is received by base station 14 and user receiver 16, satellite signals 18 may be adversely affected by ionosphere or atmospheric conditions, error in GPS broadcast ephemeris and clock data, by multipath conditions, or other factors that may cause errors in the propagation delay 18 reaching base station 14 and/or user receiver 16. Base station 14 transmits 32 additional aiding data such as, but not limited to, a unique set of initialization data, base-station-location data and size and/or boundary data. The set of initialization data includes GPS almanac or satellite ephemeris and clock data, and PRN ranging data including base station ranging measurements as received at base station 14. The boundary data includes predetermined geographic dimensions to limit a search space grid in which user receiver 16 is located.

Through the wireless assist link, user receiver 16 receives from base station 14 the set of initialization data to aid acquisition along with the base-station-location data, and the boundary data to assist in the acquisition search. Additionally, over the wireless link, user receiver 16 may be provided GPS time synchronization (time synch) function 34 from base station 14 to allow user receiver 16 to synchronize its internal clock and to reduce a search space grid associated with an unknown user clock error. User receiver 16 also receives data on the accuracy of the time synch for use in the search from base station 14, or time synch accuracy is inferred by user receiver 16 based on the boundary data. Additionally, user receiver 16 includes a time aiding function and a frequency aiding function to reduce user receiver clock error in order to reduce time search space.

Using the almanac or ephemeris data, user receiver 16 determines the number of GPS-satellite-ranging signals 18 in view for use to determine its location within the search space grid. The search space grid includes a two-dimensional search grid. The search space grid alternately may include a three-dimensional search grid. For example, in order to determine a location for the two-dimensional search space grid, at least three satellites 12 in view of user receiver 16 will be needed. Alternatively, at least four satellites 12 are needed in order to determine a location of user receiver 16 within a three-dimensional search grid. Additionally, user receiver 16 adjusts PRN codes 20 to known predictable offsets, to correlate simultaneously GPS satellite signals 18 received from each of the satellites 12 in view in order to simultaneously detect the presence of all of the signals 18 at some probable grid point location.

More particularly, after GPS time synch function and other transmitted data are received by user receiver 16, user receiver 16 starts a search 36 within a search space grid based on the set of initialization data. Referring again to FIG. 2, user receiver 16 acquires simultaneously PRN codes 20 from each of the plurality of satellites 12 in view of user receiver 16. While user receiver 16 is searching grid points in the search space grid, user receiver 16 demodulates 38 a power output of each received satellite PRN code 20 to determine a probable location of user receiver 16. More specifically, user receiver 16 searches the search space grid, sums the power output related to each received satellite code for a plurality of grid point locations within the search space grid, and determines which grid point provides a maximum combined power output for the received satellite codes. The maximum combined power output indicates a highest combined power output at a particular grid point location to identify the probable location of user receiver 16.

Figure 3:
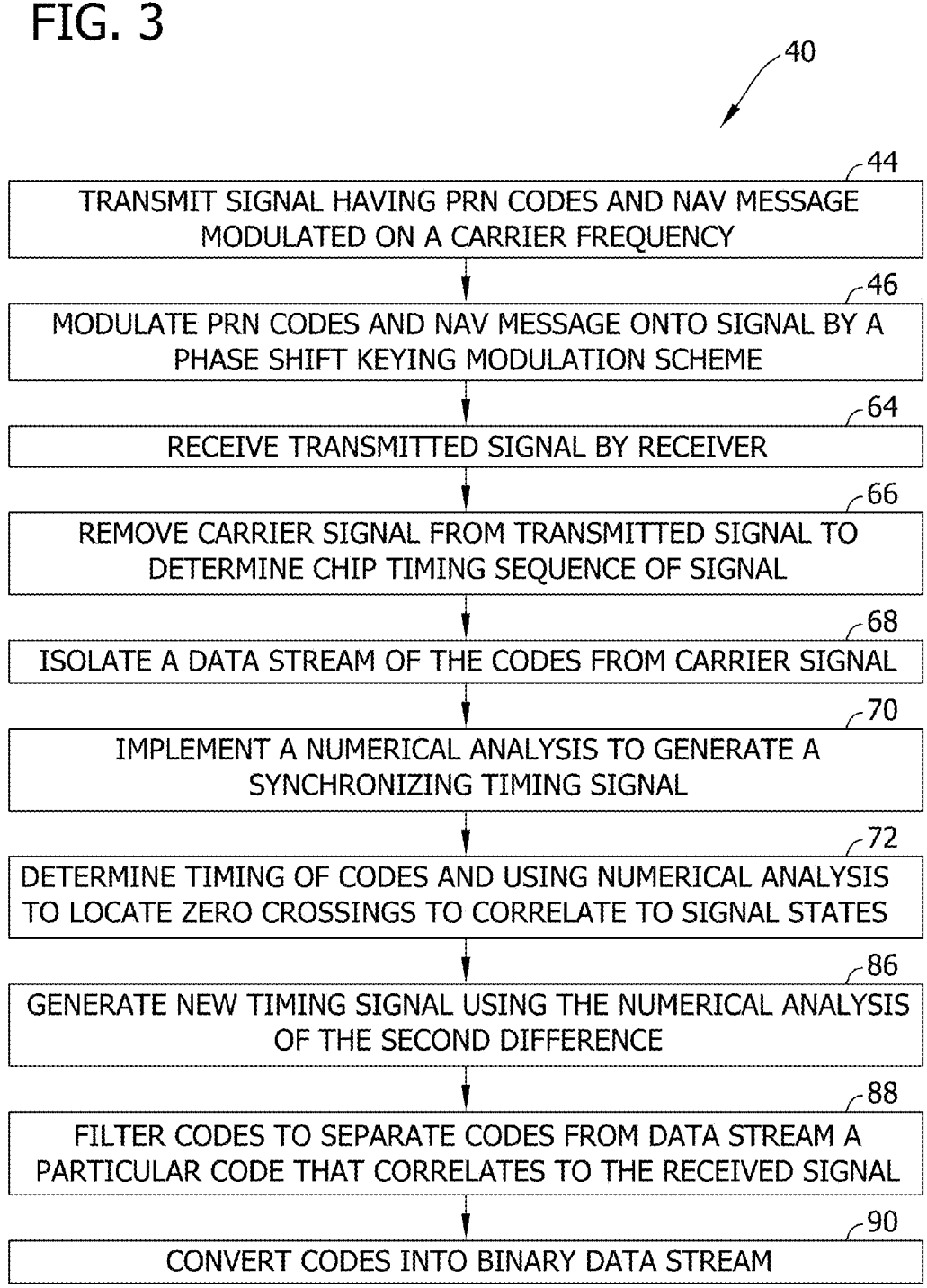
FIG. 3 is a flowchart illustrating another exemplary method of acquiring a signal.
Figure 4:
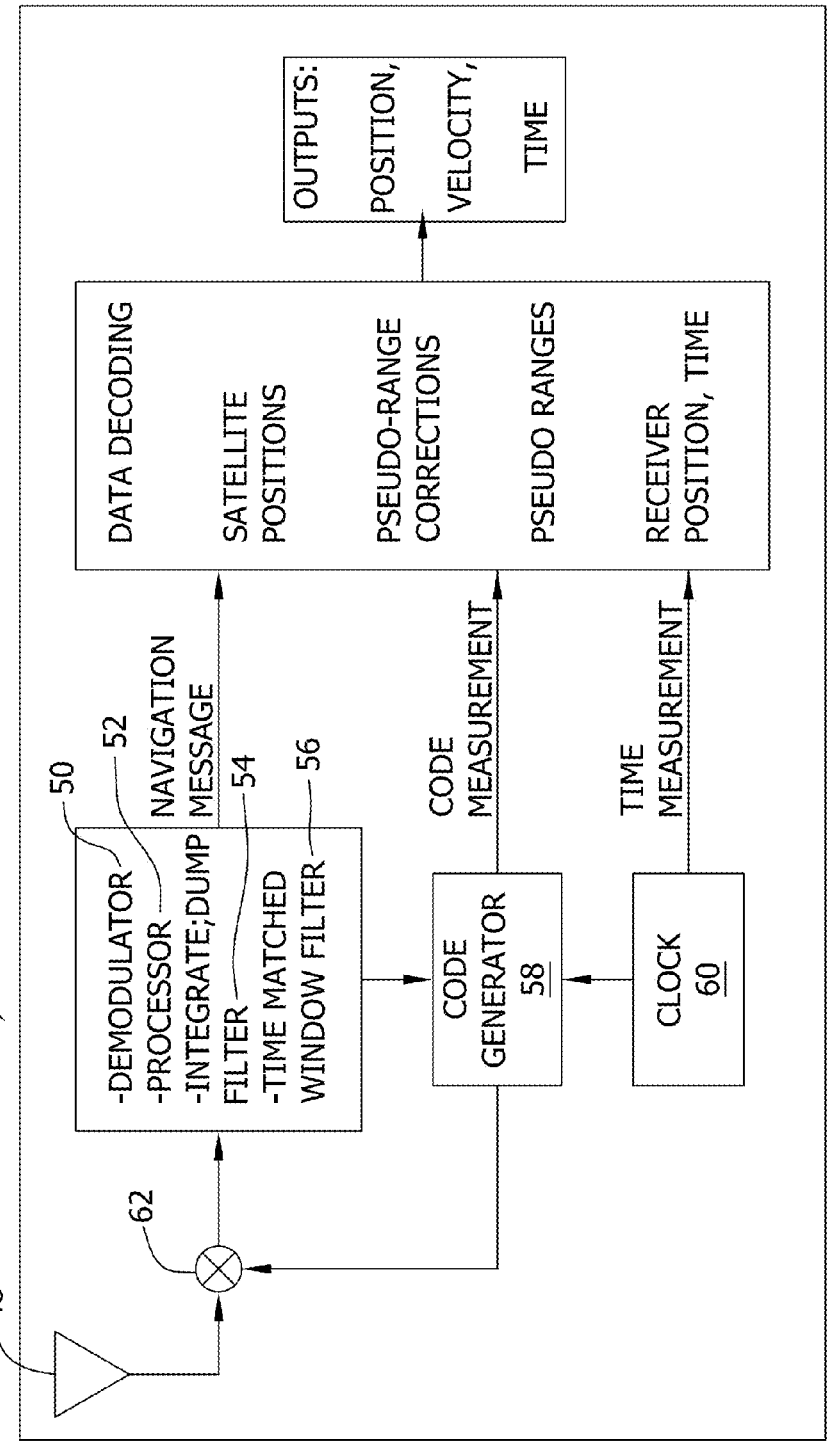
FIG. 4 is a schematic block diagram of an exemplary receiver that may be used with the GPS shown in FIG. 1 for acquiring a signal.

FIG. 3 is a flowchart illustrating an exemplary method 40 of detecting signal 18, which is non-coherent, by receiver 16. FIG. 4 is a schematic block diagram of receiver 16 that is configured to acquire and demodulate non-coherent signal 18. Referring to FIG. 3, in the exemplary embodiment, satellite 12 transmits 44 signal 18 having PRN codes 20 and Nav message 22 modulated on carrier signal 24. More particularly, satellite 12 transmits L-based carrier signals such as, but not limited to, carrier frequencies L1, L2, L3, and L5. Moreover, in the exemplary embodiment, PRN codes 20 used on L1 and L2 carrier signals are C/A, P(Y) and M. PRN codes 20 used on L3 carrier is C/A. For L5 carrier, satellite 12 is configured to modulate at least two codes: an in-phase (I5) code and a quadrature phase (Q5) code of L5 carrier.

A particular code carrying combination is configured to form signal 18. In the exemplary embodiment, signal 18 includes, but is not limited to, L1 C/A, L1 P(Y), L1M, L2 P(Y), L2M, L3 C/A, L5I5 and L5Q5. Moreover, signal 18 includes data chips 42 such as, for example, timing data chips and range data chips as shown in FIG. 1.

For transmission, PRN codes 20 and Nav message 22 are modulated 46 onto signal 18 by a phase shift keying modulation scheme that conveys data by changing or modulating a phase of signal 18. In the exemplary embodiment, satellite 12 includes a quadrature phase-shift keying (QPSK) scheme. QPSK modulation scheme includes a method of transmitting digital information across a medium, by which an RF carrier signal is passed through a three-port device (one input and two outputs) (not shown), emerging as two signals of the same frequency having half of the original power and having a phase difference of 90 degrees between them (in quadrature). One signal is called the In-phase channel (I-channel) and the other the Quadrature-phase channel (Q-channel). Each one of these channels is further divided thus obtaining two I-channels and two Q-channels, the different code, such as, for example, C/A, P, M and T/A, bi-phase modulate each channel (one code per channel), wherein amplitude is independently controlled.

Channels are combined to form a composite QPSK signal which is then transmitted to stations 14 and user receivers 16. Data chips 42 are grouped into pairs, and each pair is represented by a particular waveform, known as a symbol, to be sent across the medium after modulating signal 18. As described herein, receiver 16 demodulates signal 18 and analyzes chips 42 to determine which pair of chips 42 was transmitted by satellite 12. The QPSK scheme requires having a unique symbol for each possible combination of data bits in a pair. Because there are four possible combinations of data chips in a pair, QPSK scheme creates four different symbols, one for each pair, by changing the in phase (I gain) and quadrature phase (Q gain) for the cosine and sine modulators. A QPSK transmitter (not shown) uses both the sine and cosine at carrier frequency to transmit two separate message signals, known as the in-phase and quadrature signals.

Referring to FIGS. 4 and 3, receiver 16 includes at least an antenna 48, a demodulator 50, a processor 52, an integrate/dump filter 54, a time matched window filter 56, a code generator 58, a clock 60 and a mixer 62. Receiver 16 is configured to receive 64 transmitted signal 18. As noted, signal 18 may be distorted or corrupted during transmission. Receiver 16 is configured to lock onto signal 18 in the carrier frequency range, wherein receiver 16 is configured to remove 66 carrier signal 24 from transmitted signal 18 to determine chip timing sequence of signal 18. Because signals 18 were modulated onto carrier signal 24, receiver 16 is configured to separate signals 24, 18 after demodulation. Carrier signal 24 is removed to isolate 68 a data stream of a plurality of codes of signal 18 from carrier signal.

In the exemplary embodiment, receiver 16 is configured to implement a numerical analysis 70 to generate a synchronizing timing signal of data chips 42. In response to satellite implementing QPSK modulation scheme for signal 18, receiver 16 is configured to determine chip timing by a numerical analysis such as, but not limited to, numerical analysis of the second difference signal, for example, the second derivative equal to zero. In the exemplary embodiment, signal timing is determined by locating 72 the zero crossings or inflection points while using numerical analysis of the second difference to correlate zero crossings to signal states.

Figure 5:
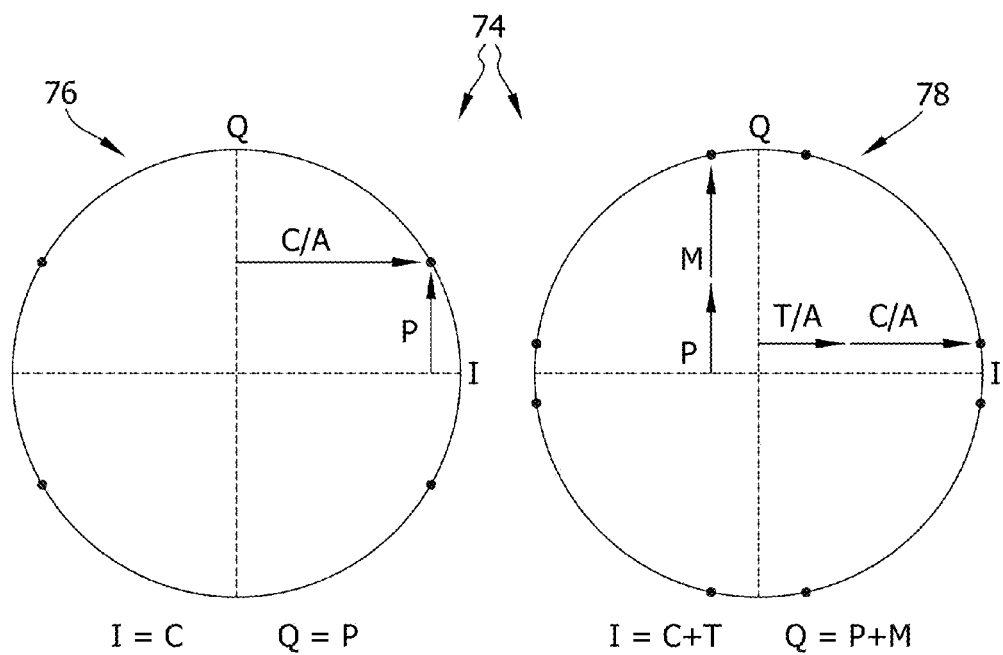
FIG. 5 is a constellation chart illustrating exemplary states of an acquired signal.

FIG. 5 illustrates constellation charts 74 for exemplary states of acquired signal 18. More particularly, a legacy constellation chart 76 and an interplex constellation chart 78 are shown. Legacy constellation chart 76 includes two codes, C code and P code, with one code per channel. Interplex constellation chart 78 includes two codes per channel, such as C code, P code, T code and M code. Once timing signal is synchronized, codes are still combined such as for example, P+M codes and/or C/A+T codes. Constellation codes are generated by receiver 16 and data chips 42 are parsed into respective signal states. Because signal 18 is non-coherent, codes are combined such that the receiver 16 does not have a replica of signals for comparison to demodulate data and timing chips. Receiver 16 is configured to process signal 18 to recover codes without having knowledge of codes such as, for example, locally generated codes or pre-loaded codes within receiver 16. In response, receiver 16 is configured to generate a new timing signal using the numerical analysis of the second difference.

Figure 6:
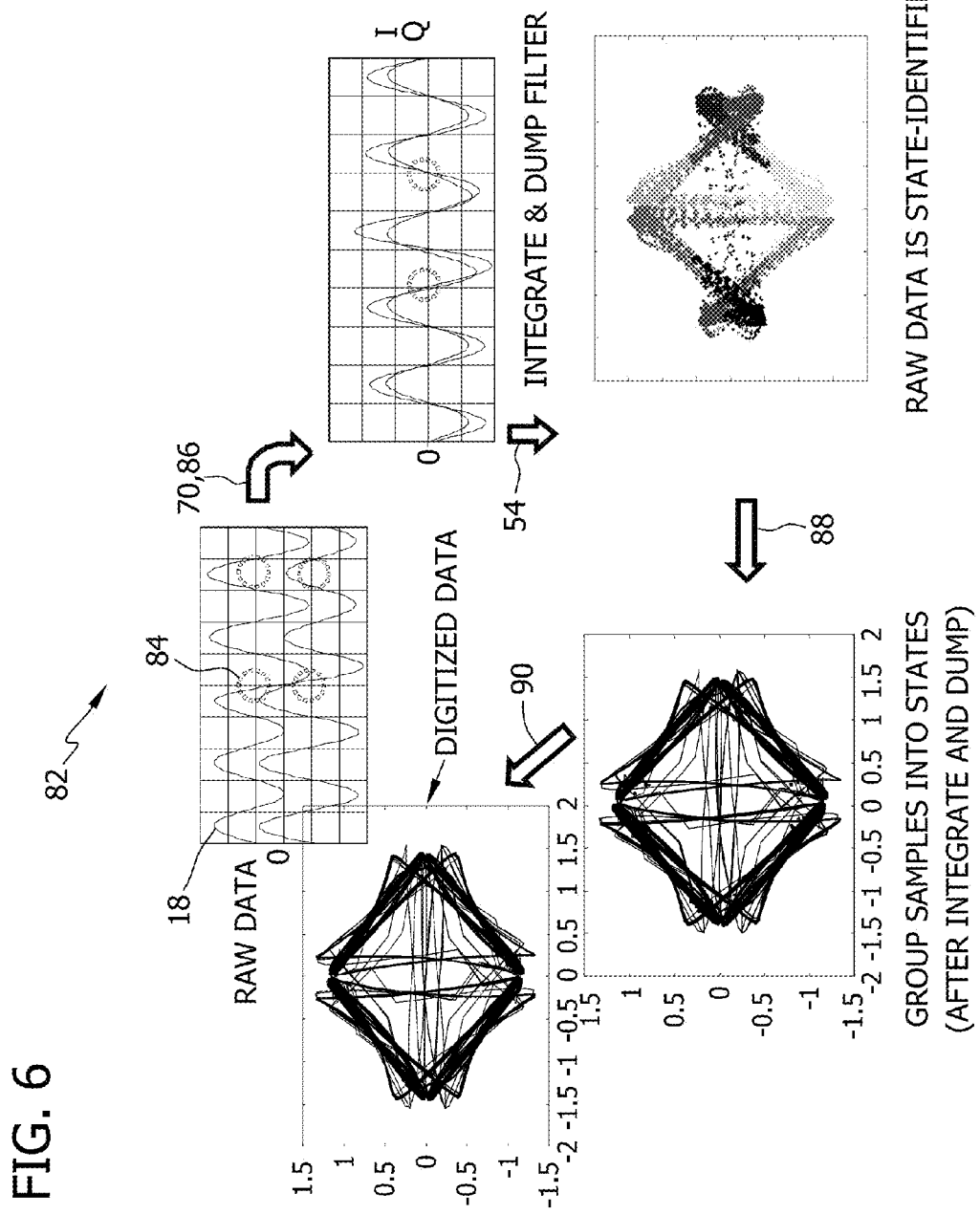
FIG. 6 is a sequence of graphs illustrating exemplary data synchronization of an acquired signal.

FIG. 6 is a sequence of graphs 82 illustrating data synchronization and state selection using the exemplary numerical analysis of the second difference at coincident, timed data transitions 84. During synchronization, receiver 16 is configured to determine the zero crossings, based on the numerical analysis of the second difference, which correlate to a chip state change. For example, the zero crossings may correspond to a symbol state change of a non-coherent signal. Receiver 16 is configured to determine timing of the plurality of codes to generate a new timing signal 86 using the numerical analysis of the second difference. More particularly, receiver 16 is configured to identify chip timing based on each zero crossing. Receiver 16 integrates each chip timing sequence to facilitate state identifying codes with data stream. In the exemplary embodiment, receiver 16 includes integrate and dump filter 54 to integrate each symbol state change of signal 18 to facilitate state identification of codes, wherein the identified codes are then grouped into states.

In the exemplary embodiment, the plurality of codes can be multiplied by one specific code of interest, for example one code per satellite 12, wherein the resulting product is low-pass filtered to eliminate high frequency signals resulting from the multiplication process and the output of the low pass filter is routed to the processor 52 in order to extract the data associated with a specific satellite 12 that utilizes a specific code of interest. This process can be performed in parallel by using multiple specific codes applied to several multipliers, for example one specific satellite code per multiplier, to enable extracting location and time data from multiple satellites 12 at the same time by parallel processing.

Receiver 16 is configured to separate combined codes. In the exemplary embodiment, P-code 20 is separated from M-code and C/A code is separated from T/A code. Since satellite information such as code assignment and signal structure are known for each satellite 12, receiver 16 is configured to separate codes. Receiver separates 16 the plurality of codes in data stream into an individual code using another filter process. In the exemplary embodiment, receiver 16 includes matched time window filter 56 to filter codes and separate codes 88 from the data stream a particular code for each plurality of codes that correlate to received signal 18. Matched time window filter 56 is configured for a specific chip rate of each of the plurality of codes of signal 18. More particularly, matched time window filter 56 is configured to filter, select, and/or separate data from each code a particular code for grouping into states.

Receiver 16 converts 90 filtered data for each code into a digitized, binary data stream. In the exemplary embodiment, binary stream of codes is correlated to the received PRN codes of particular satellite 12. Receiver 16 verifies a signal quality based on the correlated binary data. In the exemplary embodiment, signal 18 is verified for quality parameters such as, but not limited to, code power ratios, correlation loss, crosstalk, signal coherence and delays.

Exemplary embodiments of systems and methods for a satellite receiver are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for processing a non-coherent signal modulated by a plurality of codes, said method comprising:
   receiving the non-coherent signal at a receiver, wherein the non-coherent signal includes a global positioning system (GPS) signal;
   determining a timing of transitions between symbol states of the non-coherent signal using a numerical analysis of second difference of the non-coherent signal;
   identifying the symbol states based on a constellation chart for the non-coherent signal, wherein each signal state of the non-coherent signal is integrated using an integrate filter; and
   filtering the non-coherent signal based on a known chip rate of one of the plurality of codes to separate the one of the plurality of codes from the symbol states using a matched time window filter configured for the known chip rate of the one of the plurality of codes.

2. The method of claim 1 further comprising generating a synchronizing timing signal based on the determined timing of the transitions.

3. The method of claim 1 wherein said determining the timing of the transitions between symbol states comprises determining zero crossings which correspond to a symbol state change of the non-coherent signal.

4. The method of claim 1 further comprising converting the one of the plurality of codes into a binary data stream and correlating the binary data stream with the received non-coherent signal.

5. The method of claim 4 further comprising verifying a quality of the non-coherent signal based on the correlated binary data stream.

6. A receiver for processing a non-coherent signal modulated by a plurality of codes, said receiver comprising:
   an antenna configured to receive the non-coherent signal, wherein the non-coherent signal comprises a global positioning system (GPS) signal;
   a demodulator coupled to said antenna for use in removing a carrier signal from the non-coherent signal;
   a processor coupled to said demodulator, said processor programmed to determine a timing of transitions between symbol states of the non-coherent signal using a numerical analysis of second difference of the non-coherent signal and to identify the symbol states based on a constellation chart for the non-coherent signal;
   an integrate filter coupled to said processor, said integrate filter configured to integrate each signal state of the non-coherent signal to enable the identification of the symbol states; and
   a matched time window filter coupled to said processor, said matched time window filter configured based on a known chip rate of one of the plurality of codes to separate the one of the plurality of codes from the symbol states.

7. The receiver of claim 6 wherein said processor is further programmed to generate a synchronizing timing signal based on the determined timing of the transitions.

8. The receiver of claim 6 wherein said processor is further programmed to determine the timing of the transitions between symbol states by determining zero crossings corresponding to a symbol state change of the non-coherent signal.

9. A method for processing a non-coherent signal modulated by a plurality of codes, said method comprising:
- receiving the non-coherent signal at a receiver, wherein the non-coherent signal includes a global positioning system (GPS) signal;
- removing a carrier signal from the non-coherent signal;
- determining a timing of transitions between symbol states of the non-coherent signal using a numerical analysis of second difference of the non-coherent signal;
- identifying the symbol states based on a constellation chart for the non-coherent signal, wherein each signal state of the non-coherent signal is integrated using an integrate filter; and
- filtering the non-coherent signal to separate one of the plurality of codes from the symbol states using a matched time window filter configured for a known chip rate of the one of the plurality of codes.

10. The method of claim 9 further comprising determining zero crossings of the symbol states.

\* \* \* \* \*